(12) United States Patent
Meyers (10) Patent No.: US 12,284,282 B2
(45) Date of Patent: Apr. 22, 2025

(54) CLIENT-SIDE DEVICE BLOOM FILTER MAPPING

(71) Applicant: LiveRamp, Inc., San Francisco, CA (US)

(72) Inventor: Ian Meyers, Berkeley, CA (US)

(73) Assignee: LiveRamp, Inc., San Francisco, CA (US)

( * ) Notice: Subject to any disclaimer, the term of this patent is extended or adjusted under 35 U.S.C. 154(b) by 233 days.

(21) Appl. No.: 18/031,399

(22) PCT Filed: Oct. 12, 2021

(86) PCT No.: PCT/US2021/054554
§ 371 (c)(1),
(2) Date: Apr. 12, 2023

(87) PCT Pub. No.: WO2022/081560
PCT Pub. Date: Apr. 21, 2022

(65) Prior Publication Data
US 2023/0388120 A1    Nov. 30, 2023

Related U.S. Application Data

(60) Provisional application No. 63/092,990, filed on Oct. 16, 2020.

(51) Int. Cl.
| H04L 9/32 | (2006.01) |
| G06Q 30/0251 | (2023.01) |
| H04L 9/00 | (2022.01) |

(52) U.S. Cl.
CPC ....... *H04L 9/3213* (2013.01); *G06Q 30/0271* (2013.01); *H04L 9/50* (2022.05)

(58) Field of Classification Search
CPC .... G06F 21/6245; G06F 21/602; G06F 21/64; G06F 16/2255; H04L 9/50; H04L 9/3239;
(Continued)

(56) References Cited

U.S. PATENT DOCUMENTS

| 7,685,224 B2 | 3/2010 | Nye |
| 8,010,407 B1 | 8/2011 | Santoro et al. |

(Continued)

OTHER PUBLICATIONS

Pang, Yiming et al., "PROTA: A Privacy-Preserving Protocol for Real-Time Targeted Advertising," IEEE (2015).
(Continued)

*Primary Examiner* — Chris Parry
*Assistant Examiner* — Abderrahmen Chouat (57) ABSTRACT

Targeted messages are sent from a server to a client device through an app installed on the client device, but which operates without sending any personal data from the client device to any remote device. Bloom filters are created from data about the target audience and loaded in the app. User logins are resolved against the Bloom filter to targeted messages based on user identifiers. In this way, the processing to deliver a targeted message is performed on the client device, rather than on any remote device, and thus no personal information leaves the client device. Real-time view-through and click-through measurement is performed by firing conversion events to an integrated mobile network.

14 Claims, 5 Drawing Sheets

(58) Field of Classification Search
CPC ..... H04L 9/3247; H04L 9/3213; H04L 63/12; H04L 63/10; H04L 9/0643; H04L 67/1097; H04L 67/5683; H04L 63/0807; G06Q 30/0271; G06Q 30/0269

See application file for complete search history.

(56) References Cited

U.S. PATENT DOCUMENTS

| | | | |
|---|---|---|---|
| 8,453,180 | B2 | 5/2013 | Barton et al. |
| 10,122,747 | B2 | 11/2018 | Mahaffey et al. |
| 10,318,973 | B2 | 6/2019 | Milton et al. |
| 10,484,246 | B1* | 11/2019 | Leach .................... H04L 41/12 |
| 10,657,556 | B1 | 5/2020 | Lu et al. |
| 2010/0306812 | A1 | 12/2010 | Slothouber et al. |
| 2011/0288932 | A1 | 11/2011 | Marks et al. |
| 2013/0151540 | A1 | 6/2013 | Pathak et al. |
| 2013/0254024 | A1* | 9/2013 | Woods .................. G06Q 30/02 705/14.51 |
| 2013/0282485 | A1 | 10/2013 | Barsoba et al. |
| 2014/0164132 | A1 | 6/2014 | Chia et al. |
| 2014/0372216 | A1 | 12/2014 | Nath et al. |
| 2015/0081562 | A1 | 3/2015 | Roullier et al. |
| 2015/0347585 | A1* | 12/2015 | Klotz ............... G06F 16/24578 707/706 |
| 2016/0371729 | A1 | 12/2016 | Glover et al. |
| 2018/0053209 | A1* | 2/2018 | Curtin ................ G06F 16/2255 |
| 2019/0095448 | A1 | 3/2019 | Kvalnes et al. |
| 2019/0280882 | A1* | 9/2019 | Kodera .................. G06F 21/33 |
| 2020/0228666 | A1* | 7/2020 | Kendrick ............. G06Q 20/023 |
| 2021/0064391 | A1* | 3/2021 | Nguyen .............. G06F 16/9566 |
| 2022/0027498 | A1* | 1/2022 | Vandanapu ........... H04L 9/0643 |

OTHER PUBLICATIONS

Nath, Suman et al., "SmartAds: Bringing Contextual Ads to Mobile Apps," MobiSys '13 (Jun. 25-28, 2013).

Supplementary European search report for EPO Application No. 21880900.2 (dated Oct. 18, 2024).

* cited by examiner

CLIENT-SIDE DEVICE BLOOM FILTER MAPPING

CROSS-REFERENCE TO RELATED APPLICATIONS

This application claims the benefit of U.S. provisional patent application no. 63/092,990, filed on Oct. 16, 2021. Such application is incorporated herein by reference in its entirety.

BACKGROUND

The field of the invention is performing mapping on a client device to enable targeted messaging to the client device without sending any personal information concerning a user of the client device off of the device.

Traditional targeted messaging requires that personal information (PI) from a user be sent from the user's electronic device (computer, smartphone, tablet, etc.) to a server in remote communication with this client device. This remote device may be operated by a party that wishes to send a targeted message, or may be a supply-side platform (SSP), demand-side platform (DSP) or other network, that provides services to the party who wishes to send the targeted message. Often, the means by which information is sent from the user's electronic device is a software development kit (SDK), a library that is bundled into the software application or "app" that is installed on the device.

Ultimately, the party who publishes and maintains the operating system for the electronic device controls the ability of any app to send PI from the user's electronic device to any remote device. For example, Apple Computer publishes the iOS operating system used on the company's iPhone smartphones and iPad tablet devices, and Microsoft Corporation publishes the Windows operating system used on many personal computers. Should these companies or other operating system providers modify their operating systems or operating system policies in ways that restrict the ability of apps to send PI from the client device on which the operating system is installed to a remote device, then apps that depend upon this ability will cease to function properly, and will no longer work to provide targeted messages to the electronic device that are viewable by the user.

A great many of the services available through the World Wide Web and a great many apps that interact through the Internet are provided free of charge to the user. The business model for these services and apps thus depends upon the ability to deliver targeted messages to the user of the electronic device, because the funding to provide these services and apps is derived from the parties who wish to send these targeted messages. Without the ability to send targeted messages, many of these services and apps upon which users depend will no longer be economically feasible due to the loss of revenue, and will thus disappear. The users of these electronic devices will thus suffer the disadvantage of losing services and apps that they currently enjoy. Likewise, although messages will likely still appear, the messages will not be targeted, and thus will be of less interest to the user than targeted messages directed to the client device. For this same reason these messages will be of less value to the party who purchased the right to deliver the message, and therefore the quality and quantity of such apps will diminish.

The inventors hereof have recognized that if an operating system restricts the sending of PI from a user electronic device to a remote device, then it would be desirable to develop a system and method for providing targeted messages that does not require PI to be sent from the user electronic device to any remote device. But without sending PI from the client device, there must be some means by which targeting of the message can take place in order to avoid the problems just discussed.

References mentioned in this background section are not admitted to be prior art with respect to the present invention.

SUMMARY

The present invention is directed to a system and method for providing targeted messages from a remote electronic device to a user electronic device (i.e., client device) through an app installed on the client device, but which operates without sending any PI from the client device to any remote device. In certain implementations of the invention, a set of Bloom filters are created from data about those who wish to send targeted messages. These may, in certain implementations, be mapped to specific app bundle identifiers for efficient, targeted download to groups of user devices. Bloom filters are a highly space efficient data structure, such that reasonable bandwidth and storage limits for sending data to apps on the client device may be met. User logins/matched identifiers may be resolved against the set of Bloom filters to targeted messages based on user identifiers. In this way, the processing to deliver a targeted message on the basis of matching PI is performed on the client device, rather than on any remote device. Because the processing is performed locally on the client device, no PI need ever leave the client device, as all matching with PI is performed locally. Real-time view-through and click-through measurement may be performed in certain implementations by firing conversion events to an integrated mobile network, thus providing analysis of the effectiveness of the targeted messaging without providing any PI to any remote device.

Certain implementations of the present invention as described herein provide a number of advantages. First, the privacy of the user of the client device is never at risk because no PI ever leaves the client device. The user thus need not depend upon security measures maintained during communications to a remote device or be concerned about a data breach at the remote device, because there is never any PI sent across a communications network or stored on any remote device. Second, the use of highly efficient Bloom filters, as well as the use of specific app bundle identifiers rather than providing a separate set for every conceivable app, greatly limits the bandwidth and storage requirements of this approach, making them practical even for smartphones and similar devices operating with limited storage and bandwidth. Third, these implementations of the present invention provide the ability for those wishing to send targeted messages to continue doing so even if the sending of PI to a remote device is no longer facilitated by the applicable operating system; in this way, the economic viability of free-to-the-user services and apps may be maintained.

These and other features, objects and advantages of the present invention will become better understood from a consideration of the following detailed description of the preferred embodiments in conjunction with the drawings as described following:

DETAILED DESCRIPTION OF THE PREFERRED EMBODIMENT(S)

Before the present invention is described in further detail, it should be understood that the invention is not limited to the particular embodiments described in any section of the specification, and that the terms used in describing the particular embodiments are for the purpose of describing those particular embodiments only, and are not intended to be limiting, since the scope of the present invention will be limited only by the claims in a subsequent nonprovisional patent application.

Generally speaking, there are restrictions placed on how much data can be pushed from a remote device to a single client device or to a particular app on a client device. These limitations may be enforced by the operating system or the individual app. Therefore, in order to minimize the data that is delivered to any particular app or client device, certain implementations of the invention utilize a preliminary step that allows for "matchmaking" between app publishers and those who wish to provide targeted messages to the users of those apps. In one example, those wishing to deliver targeted messages may be given the option of selecting app bundles (i.e., specific app groupings) that they believe will have a high overlap with their desired messaging audience. This overlap may be facilitated by historical exposure/attribution information. In some cases, one operating system may be used as a proxy for another; for example, data from the Android operating system used on many non-Apple smartphones may be used as a proxy for iOS overlap on Apple branded smartphones based on data available through that operating system. In certain implementations a single grouping may be made for multiple apps from the same purchaser that are present on the same device; this opens up the possibility of shared storage for multiple apps, which further reduces storage and bandwidth requirements if a particular client device has installed those multiple apps. This is a common occurrence as app developers often published multiple apps that are intended to complement one another.

Figure 1:
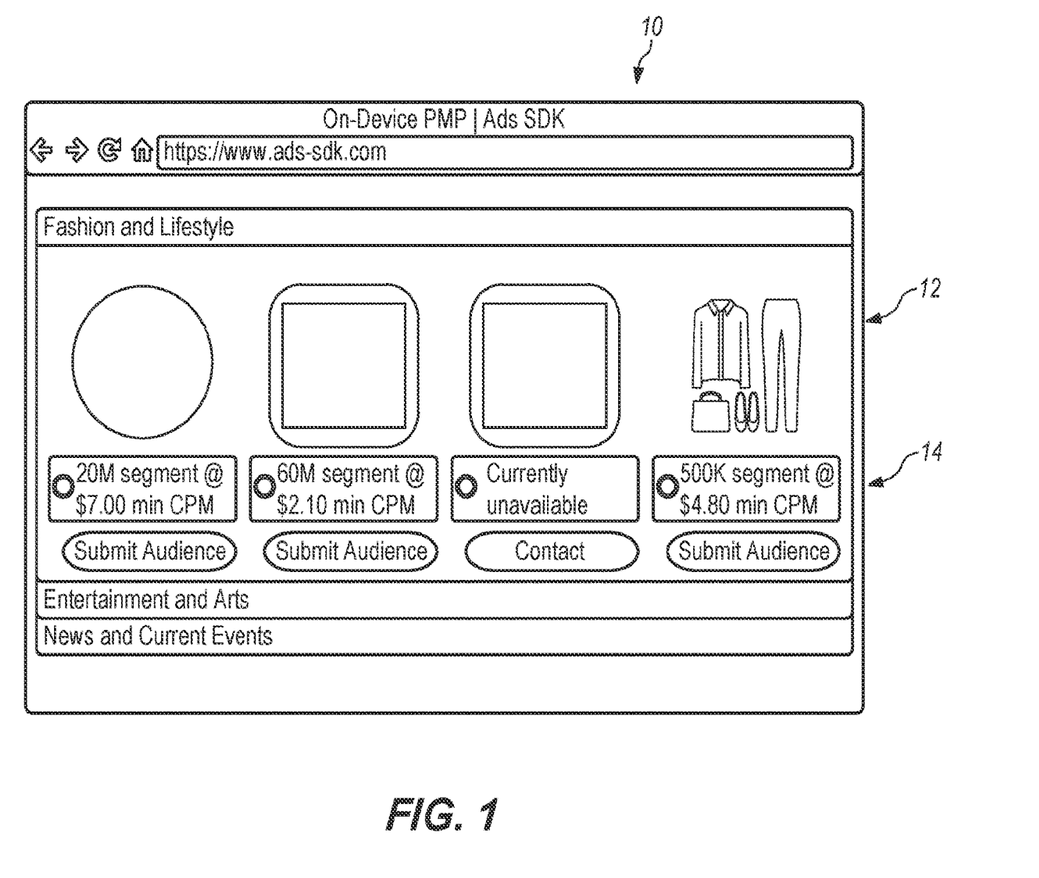
FIG. 1 is a sample screenshot of software from an implementation of the present invention which runs on a device used by a party seeking to send a targeted message according to an implementation of the present invention.

In order to facilitate this matchmaking, those who wish to deliver targeted messages may be presented with a web-based display 10 as shown in FIG. 1 from a server maintained by the DSP or other network. As will be seen, the display breaks down various groupings of apps based on categories 12, such as "fashion and lifestyle," "entertainment and the arts," and "news and current events." The options are presented to the viewer based on category, along with segment and price information 14. The viewer (e.g., the marketer or brand owner) then makes an audience selection through the graphical user interface at the display 10.

The core of audience-based message targeting is, on the basis of an available impression, determining whether or not the impression is of interest to a party wishing to send a targeted message. In other words, whether the user that is to receive the targeted message is a member of a set. Therefore, a Bloom filter created with identifiers from users of interest can be used to test identifiers from a specific user to determine set membership. A Bloom filter is a data structure that allows for a search to determine whether a given element is present in a state. The downside of a Bloom filter is that it is a probabilistic data structure; thus, it can determine whether the element is definitely not in the set or may be in the set, but it cannot determine with 100% certainty that an element is in fact within the set. An example of a Bloom filter and a search for a particular name in the Bloom filter is shown in FIG. 2.

Figure 2:
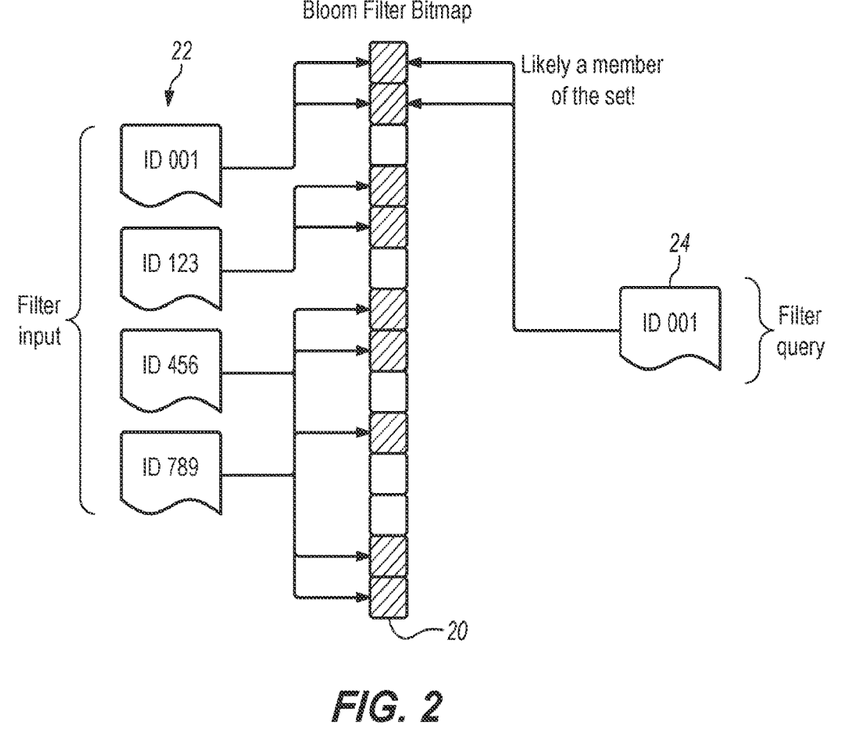
FIG. 2 is a depiction of the operation of a Bloom filter used for on-device matching.

The basic structure of a Bloom filter, as shown in FIG. 2, is a bit vector or table 20. Each empty cell in the table 20 represents a bit, and is associated with an index number. To add an element to a Bloom filter as with filter inputs 22, it is hashed and the bits are set in the bit vector 20 at the index of those hashes to 1. When a string is added, the bits at the index given by the hash are set to 1. To then test for membership of a filter query 24 in the bit vector, the string is hashed with the same hash function, then it is determined whether those values are set in the bit vector 20. If those bits are not set, then one can know with certainty that the element 24 is not in the set. If they are, however, then it can only be known that the element 24 might be in the set, because another element could have set the same bit. As will be understood, this structure requires far less storage space than a traditional data structure that fully stores all of the relevant data, although it does so by sacrificing certainty about the possibility that the desired data is definitely within the set.

The false positive rate of a Bloom filter may be modified by increasing the size of the data structure, and thus the use of a Bloom filter allows the implementations described herein to be tuned in a way that maximizes accuracy within a given limit of storage space allowed for the app or the client device. The false positive rate for a Bloom filter is approximately $(1-e^{-kn/m})^k$, where k is the number of hashing functions used, m is the number of bits for the Bloom filter, and n is the number of elements that are expected to be inserted into the filter. Given a particular value of m and n, therefore, the formula for optimizing the number of hash functions (i.e., the value of k) is $k=(m/n)\ln(2)$.

Because remote resolution services for identifiers will be unavailable in the present application, traditional identifiers or server-side secret salts cannot be used. Nevertheless, there will likely be data available to the publishers of the apps, such as an email address or telephone number. The Bloom filter may therefore use data such as email address, telephone number, or both. Because data elements such as these are PI, however, care is taken to prevent these inputs from disclosure. The PI items are encrypted by being hashed (such as, for example, using the SHA256 algorithm) and salted. The salt is kept discrete from other salts in order to protect other workflows from any inadvertent disclosure. In a mobile environment (i.e., where the client devices are smartphones and similar devices), the salt is stored as a server-side secret. The secret can be retrieved from the device by connecting over a secure (SSL/TLS) connection that leverages a pinned certificate on the device. Unless the device is jailbroken and rooted, it will not be possible to intercept any of the traffic. The server-side secret salt can be regularly rotated and/or bound to specific audiences, protecting the underlying data. In certain implementations, the items of PI may be the subject of multiple hashes using different algorithms, such as a SHA1/SHA256/MD5 hash triplet. This will increase the confidence in a match (lower the false positive rate) but also will increase the size of the Bloom filter data structure.

In order to support attribution, the tokens resulting from the hash encryption process may be prefixed (or otherwise identified or associated with) a group identifier. This is an indication of a small but non-identifiable set of users (for example, around one hundred) that could subsequently be incorporated into a conversion signal.

Figure 3:
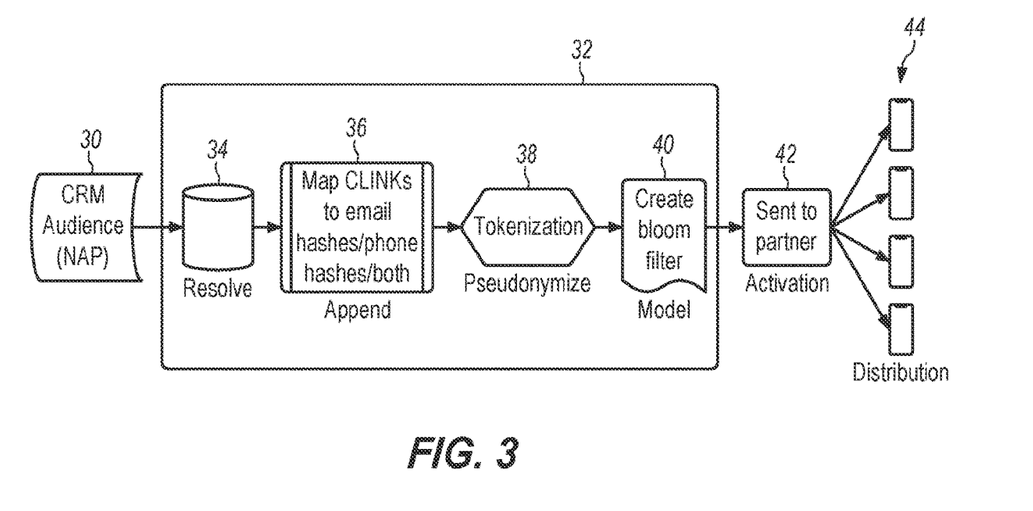
FIG. 3 is a data flow diagram according to an implementation of the present invention.

When a party seeking to send a targeting message provides a list of identifiers that it wishes to target with its message, then traditional identity resolution may be used to find a DSP's own internal linkages for those users. DSPs typically maintain links or identifiers for consumers, households, or businesses so that they can unambiguously resolve the identity of individuals in these groups. For example, this allows DSPs to unambiguously resolve different persons who have the same name, or to properly identify a person who has changed his or her name (such as due to marriage) as being a single person despite two different names that are known. One such identity resolution system is the AbiliTec service provided by LiveRamp, Inc. of San Francisco, California. Once this resolution is complete, an append/enrichment step may be performed to associate all available plaintext identifiers with the linkages. Finally, the plaintext identifiers may be tokenized/encrypted and used for the creation of the corresponding Bloom filter. A diagram illustrating this process is shown in FIG. 3, with the process in this case using LiveRamp technology.

Beginning at customer relationship management (CRM) audience data 30, this input is provided to the resolution provider 32. At resolve step 34, the CRM audience data 30 is used to resolve the members of an audience to specific links. These are then mapped at append step 36 to hashed emails, hashed telephone numbers, or both, and appended to the data structure. The data structure is then pseudonymized at tokenization step 38. The resulting data then is used to create the actual Bloom filter at model step 40. At activation step 42, the Bloom filter is distributed to partners for use in various apps. These will then eventually be distributed to user electronic devices 44 as the apps are downloaded by users.

In order to accept the Bloom filter that has thus been created, each app first configures the amount of storage that is allocated to targeted message processing and communicates the availability of this space to a server. In the time sequence example of FIG. 4, at time 50 the app communicates back to the server that it has 10 MB free. At time 52, the server then matches app bundles to Bloom filters created as described above and sets a time-to-live on the Bloom filter. In this example, the Bloom filter created has a size of 2.1 MB and is considered "good" until Jan. 1, 2021. The apps then attempt to download the bundle when convenient, such as, for example, when connected to Wi-Fi and the client device is plugged in to external power, at time 54. This may, for example, be timed for the middle of the night in order to minimize any degradation of the user experience associated with the loss of performance with the client device during this time, as shown at time 56. The filter itself is downloaded to partitioned storage available within the app or application bundle. On iOS, for example, apps and their SDK will have reservations about loading large volumes of data, such as data traditionally stored on a network server. Campaigns, therefore, will in certain implementations "bid" at a particular guaranteed dollar amount (PG) for a publisher to prioritize only the most valuable audiences at a given moment in time. Finally, at time 58 the Bloom filter has expired according to its own end date, and is deleted from the app.

Figure 4:
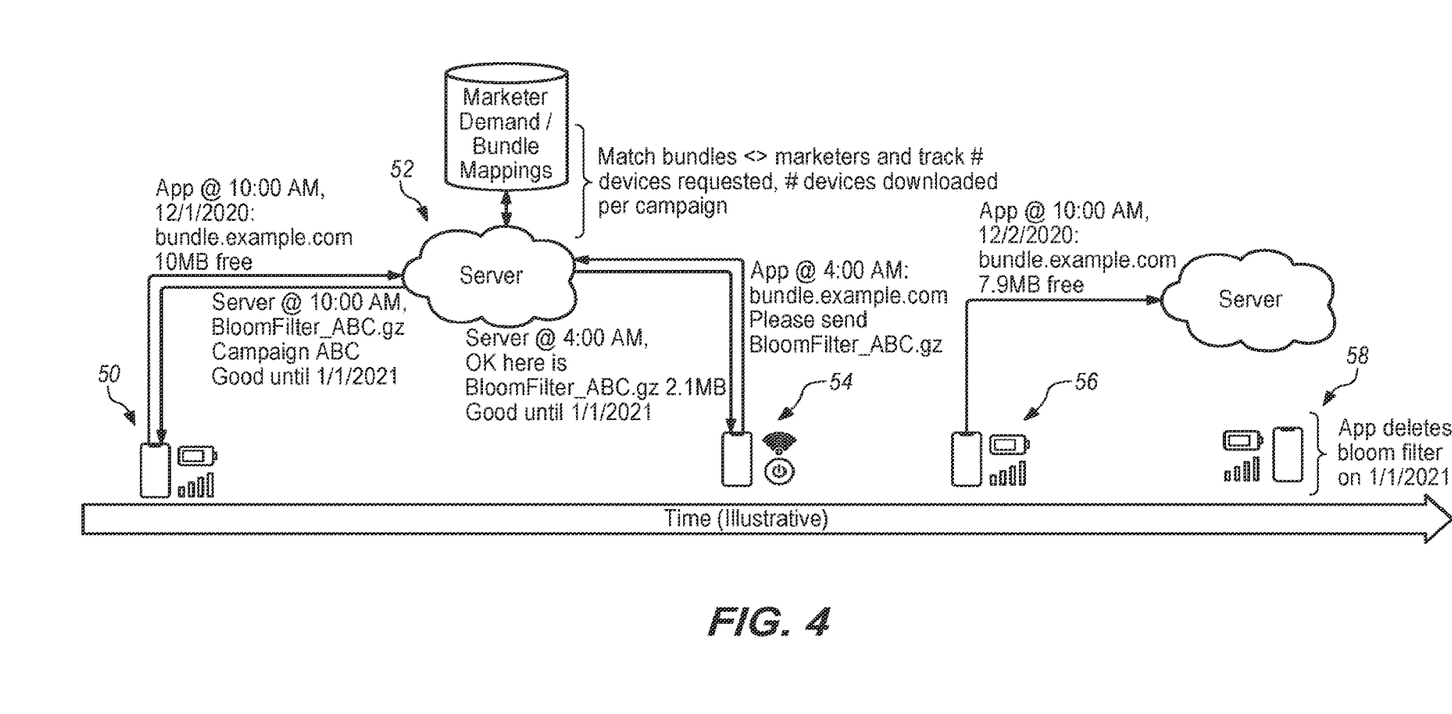
FIG. 4 is a system architecture diagram according to an implementation of the present invention.

In one particular implementation as shown in FIG. 4, the gzip file format can be used for compression. Gzipped Bloom filters that contain desired audience segments could be built as shown in Table 1 below, with the compression ratio between the raw data and the resulting Bloom filter shown in the rightmost column:

TABLE 1

| # MD5s | Input (gzipped) | Filter (gzipped) | Ratio |
|---|---|---|---|
| 10000000 | 183.7 MB | 6.7 MB | 27:1 |
| 1000000 | 18.4 MB | 1019.6 KB | 18:1 |
| 100000 | 1.8 MB | 115.6 KB | 16:1 |
| 10000 | 188.4 KB | 11.8 KB | 16:1 |

It may be seen then that if an app dedicates 10 MB (uncompressed) storage to on-device targeted messaging, it could support, for example, 847 audiences of 10 k MD5 inputs; 87 audiences of 100 k MD5 inputs; 9 audiences of 1M MD5 inputs; 1 audience of 10M MD5 inputs; or a combination of 3 audiences of 1M MD5 inputs in addition to 8 audiences of 100 k MD5 inputs. The gzipped filters may, in various implementations, be downloaded nightly or weekly over Wi-Fi and set with a campaign expiration time.

Figure 5:
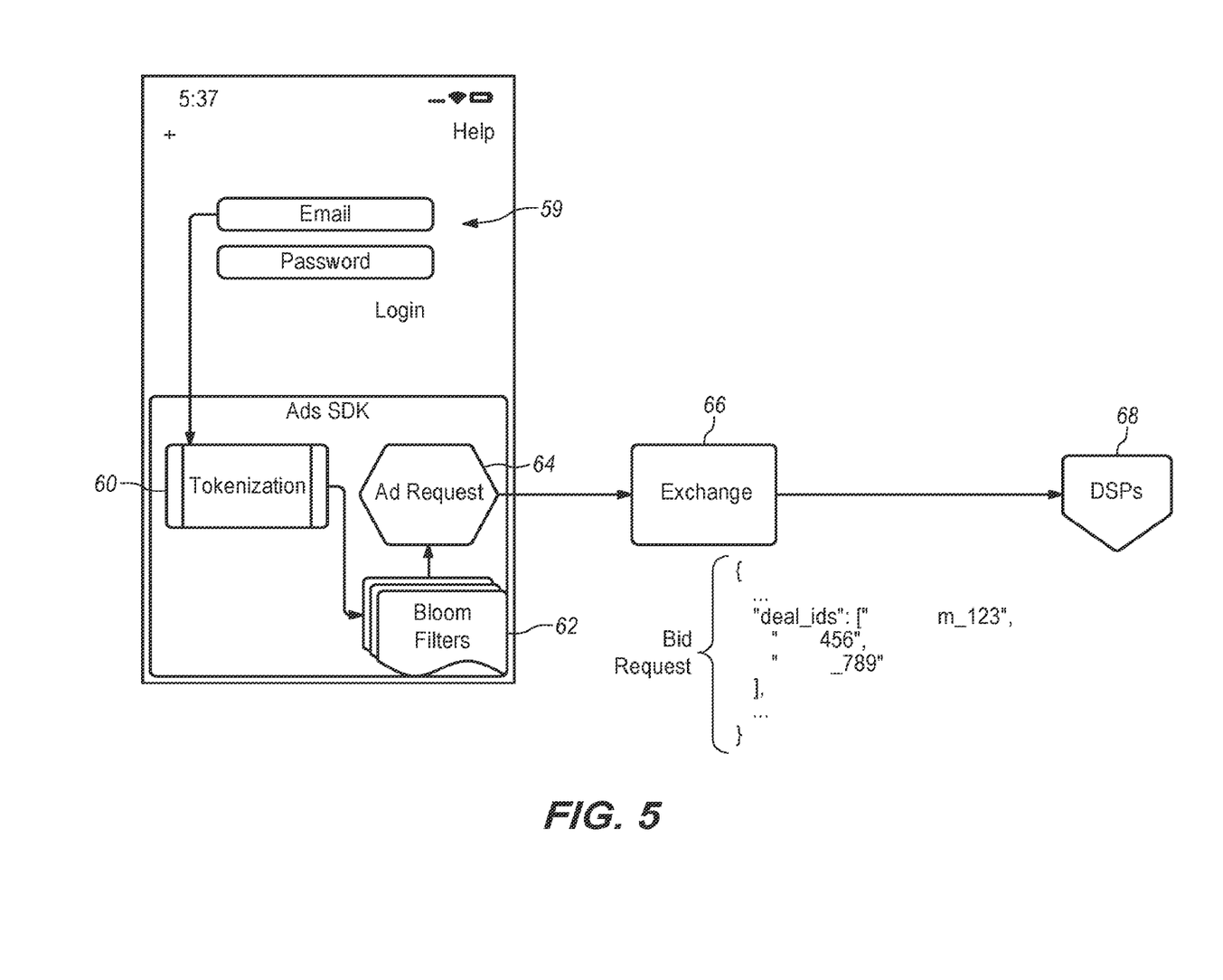
FIG. 5 is an illustration of an operation for selecting a targeted message for delivery on a client device according to an implementation of the present invention.

Referring now to FIG. 5, processing that takes place at the app for use of the Bloom filter may be described. A publisher holding PI such as an email address or telephone number 59 will pass it to a function to create a token at tokenization routine 60. This token can be queried against the set of Bloom filters 62. As already noted, the Bloom filter will give a probabilistic result of whether or not the user is in the set at some confidence interval, returning this through ad request 64 to ad exchange 66. The ad exchange 66 communicates with DSP 68. For example, the Bloom filter may in certain implementations determine with 99.9% confidence that a user is in the set. As also noted above, this interval can be adjusted depending on storage and accuracy needs. If a user matches, the SDK will flag a pre-defined deal identifier corresponding with that particular message audience from ad request 64. If not, the auction will proceed without it. Those DSPs 68 seeking to send targeted messages will know with a high degree of confidence that if their deal identifier is contained in a bid request, and that a desired user is associated with the client device, but no PI is sent off of the device in order to make this determination. In order to prevent attempts at enumerating all members of the set and thereby bypass the built-in privacy of this system, calls to the Bloom filter may, in certain implementations, be put behind a rate limit meter in order to make it infeasible to "crack" the filter by this type of brute force attack.

Figure 6:
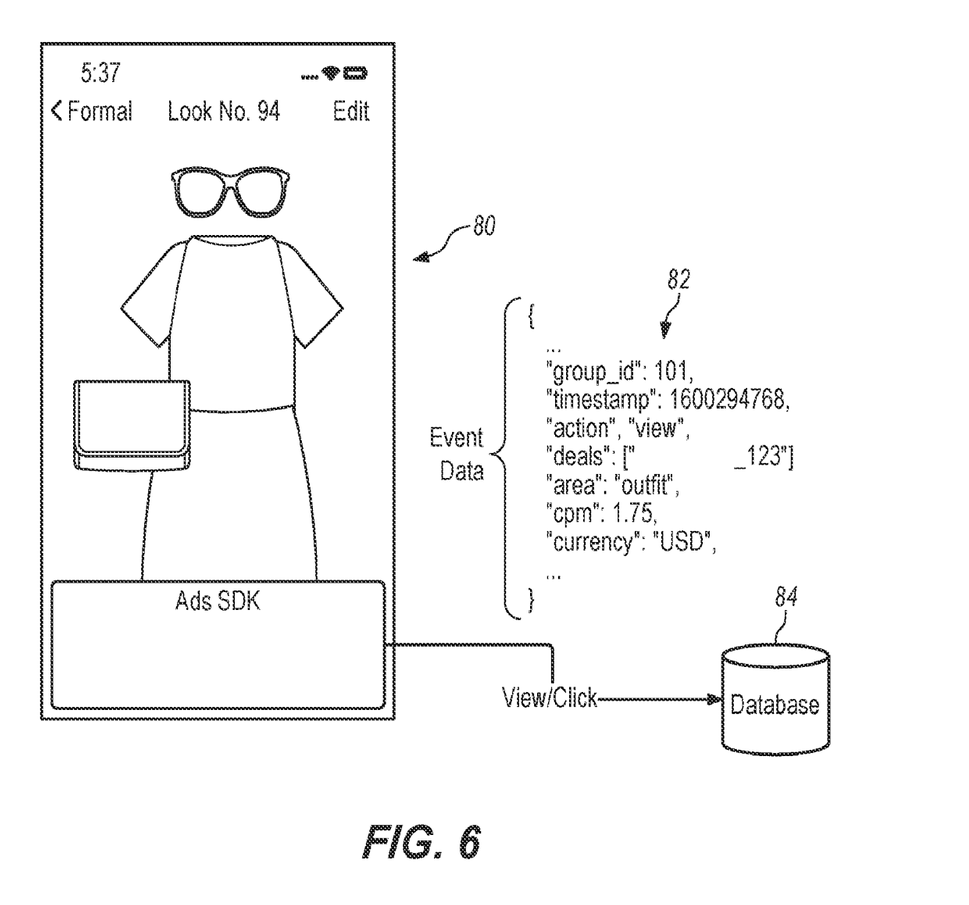
FIG. 6 is an illustration of an operation for providing analysis of the delivery of a targeted message to a client device according to an implementation of the present invention.

After-delivery attribution may be described with respect to FIG. 6. With on-device matching, user attribution after delivery of targeted messaging is inherently limited. Nevertheless, record-level events may still be supported in real time in certain implementations of the present invention. The system cannot send through user identifiers or proxies to a remote device. But when a user is served a targeted message 80 and responds, such as by clicking on an appropriate area within the display provided by the app publisher or simply viewing the displayed message 80, then a conversion event 82 is fired to the SDK server for the message 80. That conversion event 82 cannot contain user identifying information, but may contain other information that is informative in this regard. This information may, in certain examples, include the group identifier as discussed above with respect to tokenization; the bundle identifier; the deal identifier; a timestamp; and a creative unit associated with the targeted messaging. Other types of information may be used in alternative implementations, provided that no PI is sent to a remote device and the user's identity cannot be reasonably ascertained through the inclusion of these additional attributes. By enabling real-time reporting, the party who requests the sending of the targeted message is better able to map both "active" and "passive" events tied to conversions at an aggregate, if not at a personal, level. Such information may be stored for subsequent analysis at database 84.

In the implementations described herein and in various alternative implementations, the present invention may be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The invention claimed is:

1. A system for client-side mapping, comprising:
a data storage device storing a plurality of app bundles, wherein each app bundle is associated with a different category from among a plurality of categories of targeted content;
at least one data services processor coupled to at least one data services memory storing sequences of instructions which, when executed, causes the data services processor to perform:
encrypting a plurality of personal information items forming a set of personal information items using a hashing algorithm;
constructing a Bloom filter comprising a bit vector comprising a plurality of bits, wherein bits are set in the bit vector at an index corresponding to each encrypted personal information item;
determining a time-to-live parameter for the Bloom filter based on a campaign duration;
receiving a storage capacity notification indicating available storage within a predetermined storage quote allocated for targeted message processing in an app bundle;
determining that the available storage is sufficient to store the Bloom filter;
monitoring a connection state and power state;
a communications network electronically linked to the data services processor;
a client device electronically linked to the communications network, the client device comprising a display, an app data storage area, and at least one client processor coupled to at least one client memory storing sequences of instructions which, when executed, causes the client processor to perform:
receiving the Bloom filter from the data services processor across the communications network during a time window when the client device is connected to the communications network and connected to external power;
storing the Bloom filter in the app data storage area;
hashing a client-side item of personal information according to the hashing algorithm to produce a token comprising a locally hashed item of personal information;
searching the bit vector of the Bloom filter to determine if a hit occurs on a bit within the bit vector for the token;
if a hit occurs on a bit within the bit vector for the token, setting a targeted message on the display, and if a hit does not occur on a bit within the bit vector for the locally hashed item of personal information, then not setting a targeted message on the display; and
automatically deleting the Bloom filter from the app data storage area upon expiration of the time-to-live parameter.

2. The system of claim 1, wherein at least one of the plurality of app bundles comprise a plurality of apps developed by a common publisher.

3. The system of claim 1, wherein each of the plurality of personal information items is a telephone number or an email address.

4. The system of claim 1, wherein the client memory sequences of instructions, when executed, further cause the at least one client device processor to graphically generate a prompt on the display for a user to input the client-side item of personal information.

5. The system of claim 1, wherein the client memory sequences of instructions, when executed, further cause the at least one client device processor to add a group identifier associated with the locally hashed item of personal information to the token.

6. The system of claim 5, wherein each group identifier is drawn from a set of group identifiers, wherein each group identifier in the set of group identifiers is uniquely associated with a grouping of users.

7. The system of claim 1, wherein the data services memory sequences of instructions, when executed, further cause the at least one data services processor to receive a set of target identifiers from a messaging server operated by a party seeking to send a targeted message at the data services provider, and perform identity resolution against the set of target identifiers to create a set of links, wherein each of the links are uniquely associated with a particular user within an identity resolution database in communication with the at least one data services processor.

8. A computerized method for client-side mapping, comprising:
constructing, at a data services provider server, a plurality of app bundles, wherein each app bundle is associated with a different category from among a plurality of categories of targeted content;
at a data services provider server, encrypting a plurality of personal information items forming a set of personal information items using a hashing algorithm;
constructing a Bloom filter comprising a bit vector comprising a plurality of bits, wherein bits are set in the bit vector at an index corresponding to each encrypted personal information item;
determining a time-to-live parameter for the Bloom filter based on a campaign duration;
receiving, from a client device, an indication of available storage capacity within a predetermined storage quota allocated for targeted message processing in a client app bundle on the client device;
determining that the available storage capacity is sufficient to store the Bloom filter;
monitoring a state of the client device to identify when the client device is both connected to a communications network and to an external power source;
pushing the Bloom filter across the communications network from the data services provider server to the client device during a time window when the client device is connected to the communications network and the external power source, and storing the Bloom filter in an app data storage area associated with the client app bundle on the client device;
receiving from an app in the client app bundle a client-side item of personal information;
hashing the client-side item of personal information according to the hashing algorithm to produce a token comprising a locally hashed item of personal information;
searching the bit vector of the Bloom filter to determine if a hit occurs on a bit within the bit vector for the token;
if a hit occurs on a bit within the bit vector for the token, using the app to set a targeted message on a display of the client device, and if a hit does not occur on a bit within the bit vector for the locally hashed item of personal information, then not setting a targeted message on the display of the client device; and automatically removing the Bloom filter from the app data storage area upon expiration of the time-to-live parameter.

9. The method of claim 8, wherein at least one of the plurality of app bundles comprise a plurality of apps developed by a common publisher.

10. The method of claim 8, wherein each of the plurality of personal information items is a telephone number or an email address.

11. The method of claim 8, wherein the step of receiving from the app a client-side item of personal information further comprises the step of graphically generating a prompt on a display of the client device for a user to input the client-side item of personal information.

12. The method of claim 8, wherein the token further comprises a group identifier associated with the locally hashed item of personal information.

13. The method of claim 12, wherein each group identifier is drawn from a set of group identifiers, wherein each group identifier in the set of group identifiers is uniquely associated with a grouping of users.

14. The method of claim 8, further comprising the step of receiving a set of target identifiers from a messaging server operated by a party seeking to send a targeted message at the data services provider, and performing identity resolution against the set of target identifiers to create a set of links, wherein each of the links are uniquely associated with a particular user within an identity resolution database in communication with the data services provider server.

* * * * *